July 17, 1928.
E. J. KROEGER
COUPLING
Filed March 6, 1926
1,677,865
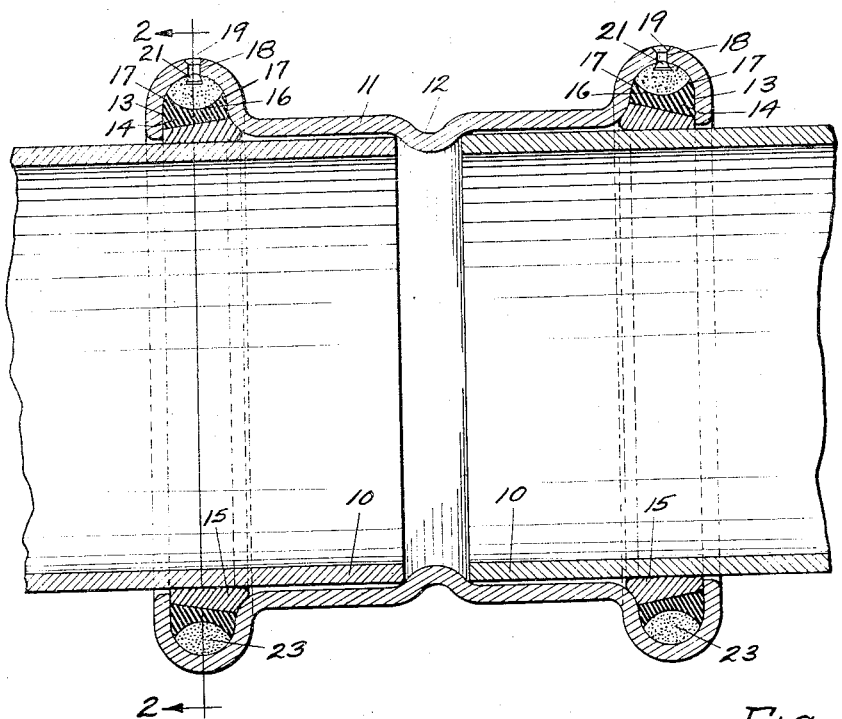
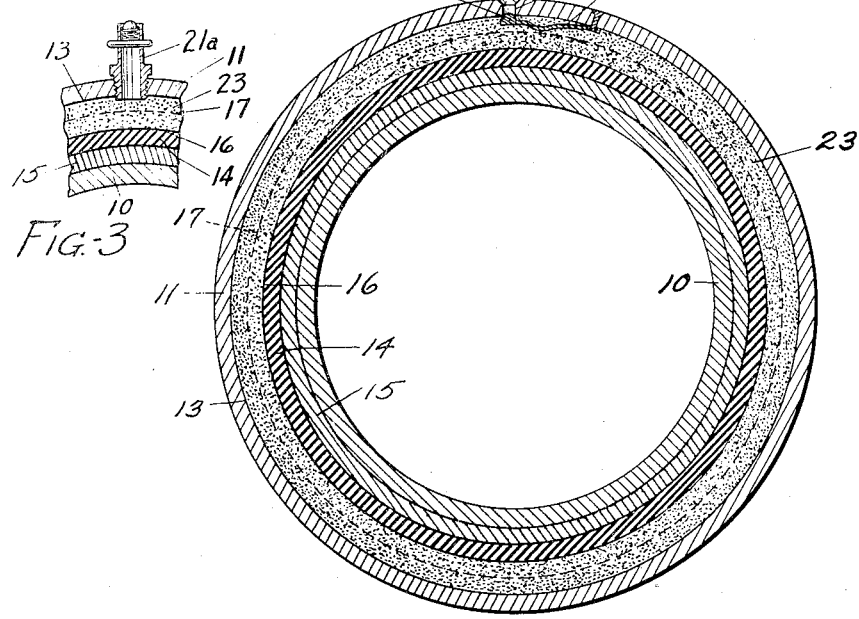
INVENTOR.
EDWIN J. KROEGER
BY
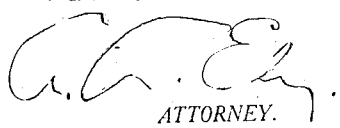
ATTORNEY.

Patented July 17, 1928.

1,677,865

UNITED STATES PATENT OFFICE.

EDWIN JOHN KROEGER, OF AKRON, OHIO, ASSIGNOR OF THREE-FOURTHS TO SELDEN LORD, OF AKRON, OHIO.

COUPLING.

Application filed March 6, 1926. Serial No. 92,683.

This invention relates to pipe joints or couplings, and in particular to couplings for use in connecting large pipe sections in systems such as are installed for conducting oil, natural gas, etc.

The chief object of the invention is to provide a simple coupling adapted to facilitate laying of a pipe line of large pipe sections and effectively to seal the joint between each section.

The foregoing and other objects are obtained by the coupling disclosed in the accompanying drawings and described below. It is to be understood that the invention is not limited to the specific form thereof shown and described.

Of the accompanying drawings:

Figure 1 is a diametral section through a pipe system at a joint therein and showing the improved coupling installed.

Figure 2 is a section on line 2—2 of Figure 1; and

Figure 3 is a similar section showing another form of the invention.

Referring to the drawings, 10, 10 indicate adjacent ends of sections of pipe in a system. The improved coupling of the invention is shown generally at 11 and comprises a sleeve formed with a central inwardly projecting rib at 12 providing a stop for the ends 10 of the pipe sections, and with annular gutters 13, 13 on the inner side thereof at its ends.

In the gutters 13 are fitted composite annular gaskets each comprising an outer ring 14 of resilient material such as rubber, and an inner protecting packing ring 15 of soft deformable material capable of withstanding the action of rubber-deteriorating fluids. Suitable materials, such as lead or other soft metals, may be employed, for example, in pipe systems for oil. The gaskets are formed with outer peripheral grooves 16 so as to provide spaces in gutters 13 in back of the gaskets and also to provide lips 17, 17 on the gaskets. Gutters 13 each have a duct 18 therein which is counter bored as at 19 so that the nozzle of a suitable material expressing gun (not shown) can be inserted therein. A check valve comprising a head 21 adapted to close the inner end of duct 18 and a strip of spring metal 22 carrying said head on one end, is arranged in the gutter by riveting the other end to sleeve 11. Instead of the valve 21, a standard type of check valve fitting 21ª may be provided (Figure 3).

In making a joint, the parts are assembled as shown in Figure 1. The expressing gun is applied to the ducts 18 and a suitable plastic material 23 adapted to set or harden, such as a cement mixture, asphaltum, heavy oils, or the like, is forced into the spaces in back of the gaskets under high pressure, until the back pressure from the material closes valves 21. This causes packing rings 15, 15 to be compressed against the pipe under great pressure so as effectively to seal against leakage about the inner periphery of the gaskets and also urges lips 17, 17 under great pressure against the walls of gutters 13 so as effectively to seal against leakage through the gutters about the outer peripheries of the gaskets. Hardening of the material 23 holds the gaskets permanently under the action of the compressive forces, thus producing a permanent seal.

The invention is capable of wide application in many industries. For example, in systems for conducting acids in which earthenware, hard rubber or other acid resisting materials are employed for the pipe sections, a joint of the character described herein in which a rubber gasket is employed, will provide a very effective acid-proof seal.

Modifications of the invention may be resorted to without departing from the spirit thereof or the scope of the appended claims.

What is claimed is:

1. A pipe joint comprising an element on one pipe end embracing another pipe end, said element having a gutter on the inside thereof, a rubber gasket fitted in the gutter defining a space about the gasket within the gutter, said gutter being adapted to be supplied with a fluid pressure medium for said space, and a packing ring within the gutter of soft deformable material adapted to protect the rubber gasket from the action of any fluid in the system tending to deteriorate rubber.

2. A pipe joint comprising inner and outer telescoping pipe members, the outer member having an internal circumferential groove formed therein, a gasket of deformable material positioned within the radially inner portion of said groove and surrounding said inner pipe member, a fluid pressure medium under pressure within the space in said groove surrounding said gasket for radially compressing said gasket against said inner pipe member, and means intermediate said pressure medium and said gasket for sealing the space in said groove.

3. A pipe coupling including a sleeve having a channel on its inner surface, a gasket fitted in said channel, said gasket comprising an inner layer of flexible material and an outer layer of rubber, said sleeve having an inlet leading to said channel, a closure for said inlet, and an initially plastic medium in the channel and around the gasket forced through said inlet into the channel under pressure and hardened in situ.

EDWIN JOHN KROEGER.